United States Patent
Lin et al.

(10) Patent No.: US 9,436,787 B2
(45) Date of Patent: Sep. 6, 2016

(54) METHOD OF FABRICATING AN INTEGRATED CIRCUIT WITH OPTIMIZED PATTERN DENSITY UNIFORMITY

(71) Applicant: Taiwan Semiconductor Manufacturing Company, Ltd., Hsin-Chu (TW)

(72) Inventors: Jyuh-Fuh Lin, Miaoli County (TW); Pei-Yi Liu, Changhua County (TW); Cheng-Hung Chen, Hsinchu County (TW); Wen-Chuan Wang, Hsinchu (TW); Shy-Jay Lin, Hsinchu County (TW); Burn Jeng Lin, HsinChu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 105 days.

(21) Appl. No.: 14/252,464

(22) Filed: Apr. 14, 2014

(65) Prior Publication Data

US 2015/0294056 A1      Oct. 15, 2015

(51) Int. Cl.
G06F 17/50        (2006.01)
G03F 1/36         (2012.01)
H01L 27/02        (2006.01)

(52) U.S. Cl.
CPC ....... *G06F 17/5068* (2013.01); *G06F 17/5009* (2013.01); *G06F 17/5081* (2013.01); *G03F 1/36* (2013.01); *G06F 2217/12* (2013.01); *H01L 27/0207* (2013.01)

(58) Field of Classification Search
None
See application file for complete search history.

(56) References Cited

U.S. PATENT DOCUMENTS

2002/0116686 A1*  8/2002  Shin ................. H01L 21/76819
                                                              716/55
2015/0294057 A1   10/2015  Lin et al.

* cited by examiner

*Primary Examiner* — A. M. Thompson
(74) *Attorney, Agent, or Firm* — Haynes and Boone, LLP

(57) ABSTRACT

The present disclosure provides a method that includes receiving an IC design layout having main features and generating a plurality of space block layers to the IC design layout. The method also includes calculating main pattern density $PD_0$ and dummy pattern density $PD_s$ of the IC design layout and calculating a least variation block dummy density ratio (LVBDDR) of the IC design layout for each of the space block layers according to the main pattern density and the dummy pattern density. The method further includes choosing an optimized space block layer and an optimized block dummy density ratio according to the LVBDDR and generating a modified IC design layout from the IC design layout according to the optimized space block layer and the optimized block dummy density ratio. Additionally, the method includes forming a tape-out data of the modified IC design layout for IC fabrication.

20 Claims, 7 Drawing Sheets

METHOD OF FABRICATING AN INTEGRATED CIRCUIT WITH OPTIMIZED PATTERN DENSITY UNIFORMITY

BACKGROUND

The integrated circuit (IC) design is more challenging when semiconductor technologies are continually progressing to smaller feature sizes, such as 45 nanometers, 28 nanometers, and below. The performance of a chip design is seriously influenced by the control of resistance/capacitance (RC), timing, leakage, and topology of the metal/dielectric inter-layers. Those are further related to resolution of the lithography patterning and the imaging accuracy.

To enhance the imaging effect when a design pattern is transferred to a wafer, an optical proximity correction (OPC) to minimize the proximity effect is indispensable. Assist features are added to an IC pattern to improve the imaging resolution of the IC pattern during a lithography patterning process.

In other side, during the semiconductor fabrication, a chemical mechanical polishing (CMP) process is applied to the wafer for polishing back and globally planarizing wafer surface. CMP involves both mechanical grinding and chemical etching in the material removal process. However, because the removal rates of different materials (such as metal and dielectric material) are usually different, polishing selectivity leads to undesirable dishing and erosion effects. Dishing occurs when the copper recedes below or protrudes above the level of the adjacent dielectric. Erosion is a localized thinning of the dielectric. In this case, dummy features are inserted into the IC pattern to enhance the CMP performance.

However, along with the progress of semiconductor technology, the feature sizes are getting smaller and smaller. The existing methods to add various dummy features have limited degree of freedom and effectiveness to tune the pattern density and poor uniformity of the pattern density. Especially, this presents more issues, such as space charge effect and micro-loading effect, when an electron-beam lithography technology is used to form the IC pattern.

Therefore, what is needed is a method for IC design and mask making to effectively and efficiently adjusting an IC pattern to address the above issues.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

Figure 1:
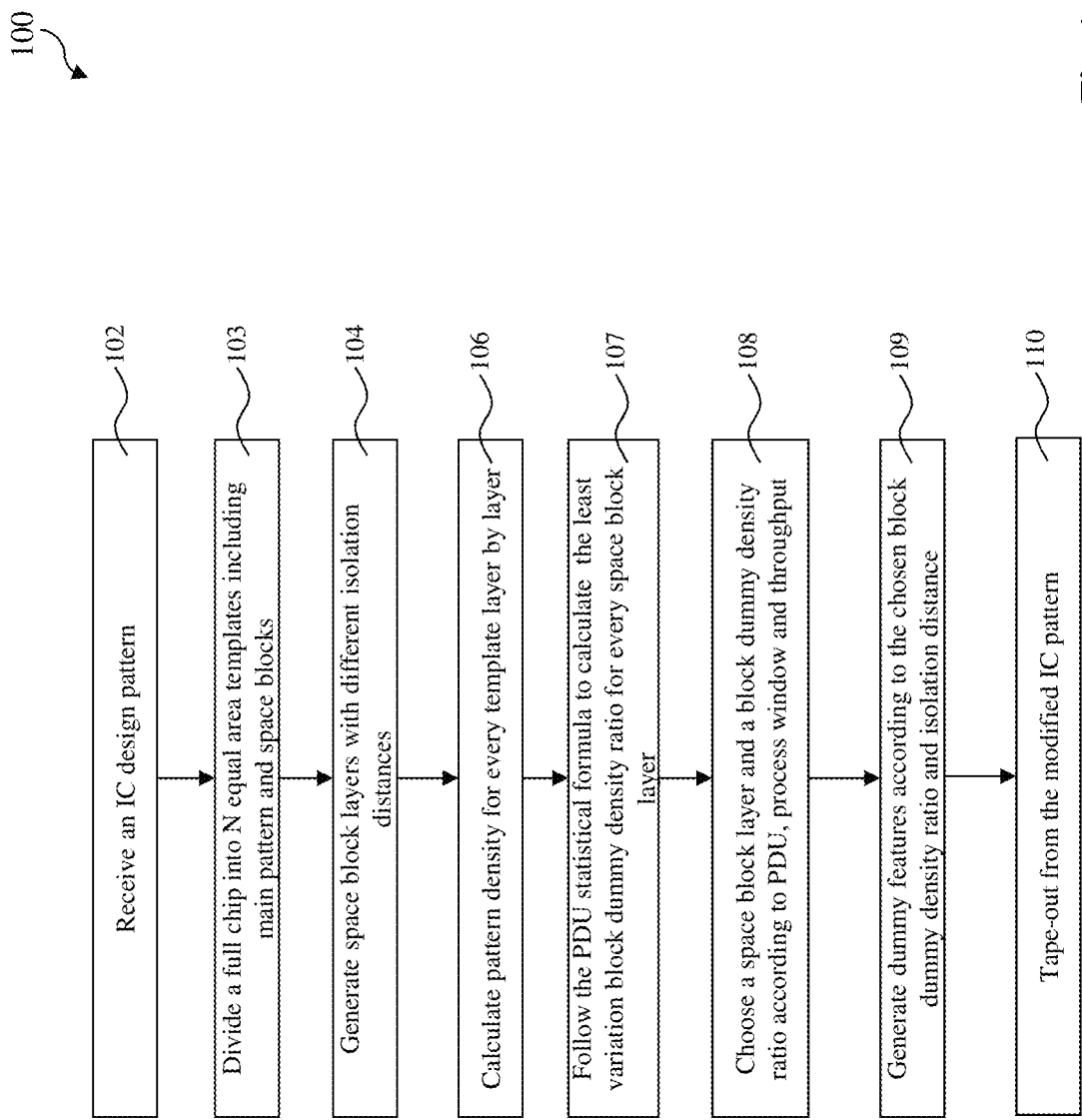
FIG. 1 is a flowchart of an embodiment of an integrated circuit (IC) method constructed according to aspects of the present disclosure.

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

FIG. 1 is a flowchart of a method 100 for integrated circuit (IC) designing constructed according to various aspects of the present disclosure in one or more embodiments. The method 100 provides a procedure to effectively insert dummy features with optimized IC performance. The dummy features are features added to the IC design pattern for various fabrication functions. In one embodiment, dummy features are added to the IC design pattern to vary pattern density to improve chemical mechanical polishing (CMP) process applied to a semiconductor substrate during IC fabrication. In another embodiment, dummy features are added to the IC design pattern to vary thermal effect to improve a thermal annealing process applied to the semiconductor substrate during IC fabrication. In yet another embodiment, dummy features are added to the IC design pattern to correct optical proximity effect and enhance the imaging resolution for a lithography patterning process applied to the semiconductor substrate during IC fabrication. Those dummy features are sub-resolution features (non-printable to the semiconductor substrate) and are also referred to as optical proximity correction (OPC) features. The method 100 is described with reference to FIGS. 1 through 7.

The method 100 begins at operation 102 by receiving an IC design layout, such as from a designer. In one example, the designer is a design house. In another example, the designer is a design team separated from a semiconductor manufacturer assigned for making IC products according to the IC design layout. In various embodiments, the semiconductor manufacturer is capable for making photomasks, semiconductor wafers, or both. The IC design layout includes various geometrical patterns designed for an IC product based on the specification of the IC product.

The IC design layout is presented in one or more data files having the information of geometrical patterns. In one example, the IC design layout is expressed in a "gds" format known in the art. The designer, based on the specification of the IC product to be manufactured, implements a proper design procedure to generate the IC design layout. The design procedure may include logic design, physical design, and place and route. As an example, a portion of the IC design layout includes various IC features (also referred to as main features), such as active region, gate electrode, source and drain, metal lines or contacts/via of the interlayer interconnect structure, and openings for bonding pads, to be formed on a semiconductor substrate (such as a silicon wafer) or on various material layers disposed over the semiconductor substrate. The IC design layout may include additional features, such as those features for imaging effect, processing enhancement, and/or mask identification information.

Figure 2:
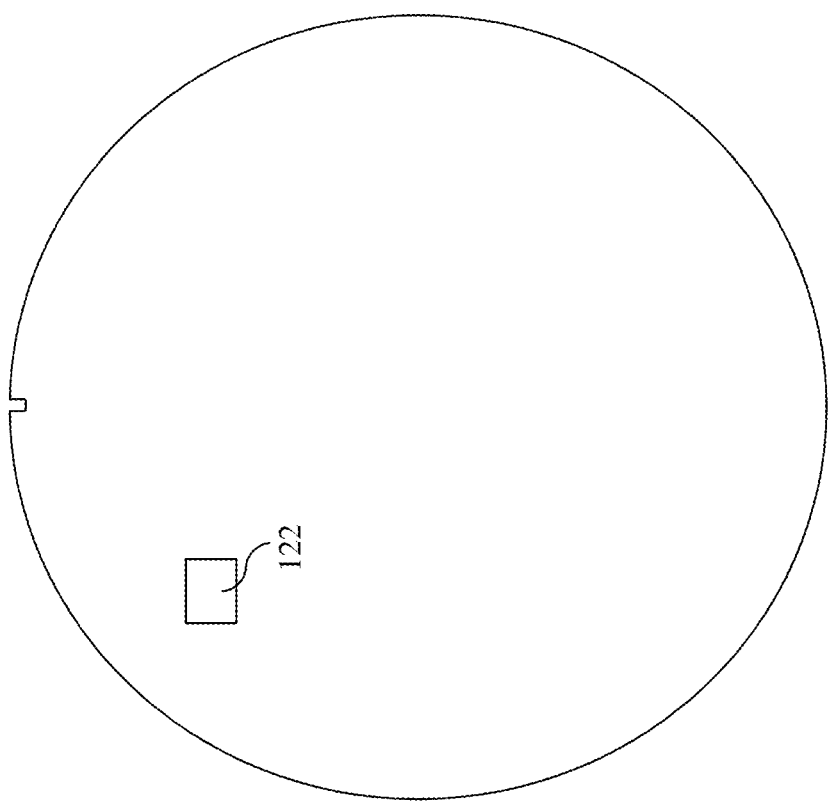
FIG. 2 is a schematic view of a semiconductor substrate constructed according to aspects of the present disclosure in one embodiment.

FIG. 2 illustrates a schematic view of a semiconductor substrate 120 constructed according to one embodiment. In the present embodiment, the semiconductor substrate 120 is a semiconductor wafer, such as silicon wafer. In other embodiments, the semiconductor substrate 120 may alternatively or additionally include other semiconductor material, such as germanium (Ge), silicon germanium (SiGe), silicon carbide (SiC), indium arsenide (InAs), or indium phosphide (InP), or a suitable alloy semiconductor, such as silicon germanium carbide, gallium arsenic phosphide, or gallium indium phosphide. Alternatively, the substrate 120 may include a non-semiconductor material such as a glass substrate for thin-film-transistor liquid crystal display (TFT-LCD) devices. The semiconductor substrate 120 may include various doped regions, dielectric features, and multilevel interconnects. In one embodiment, the substrate 120 includes various doped features for various microelectronic components, such as a complementary metal-oxide-semiconductor field-effect transistor (CMOSFET), imaging sensor, memory cell, and/or capacitive element. In another embodiment, the substrate 120 includes conductive material features and dielectric material features configured for coupling and isolating various microelectronic components, respectively. In another embodiment, the semiconductor substrate 120 includes one or more material layers (such as a dielectric material layer) formed thereon.

The semiconductor substrate 120 further includes various circuit regions 122 defined for IC chips separated from each other by scribe lines. Integrated circuits are to be formed in the circuit regions 122. In one embodiment, the IC design layout is to be formed in each of the circuit regions 122.

Figure 3:
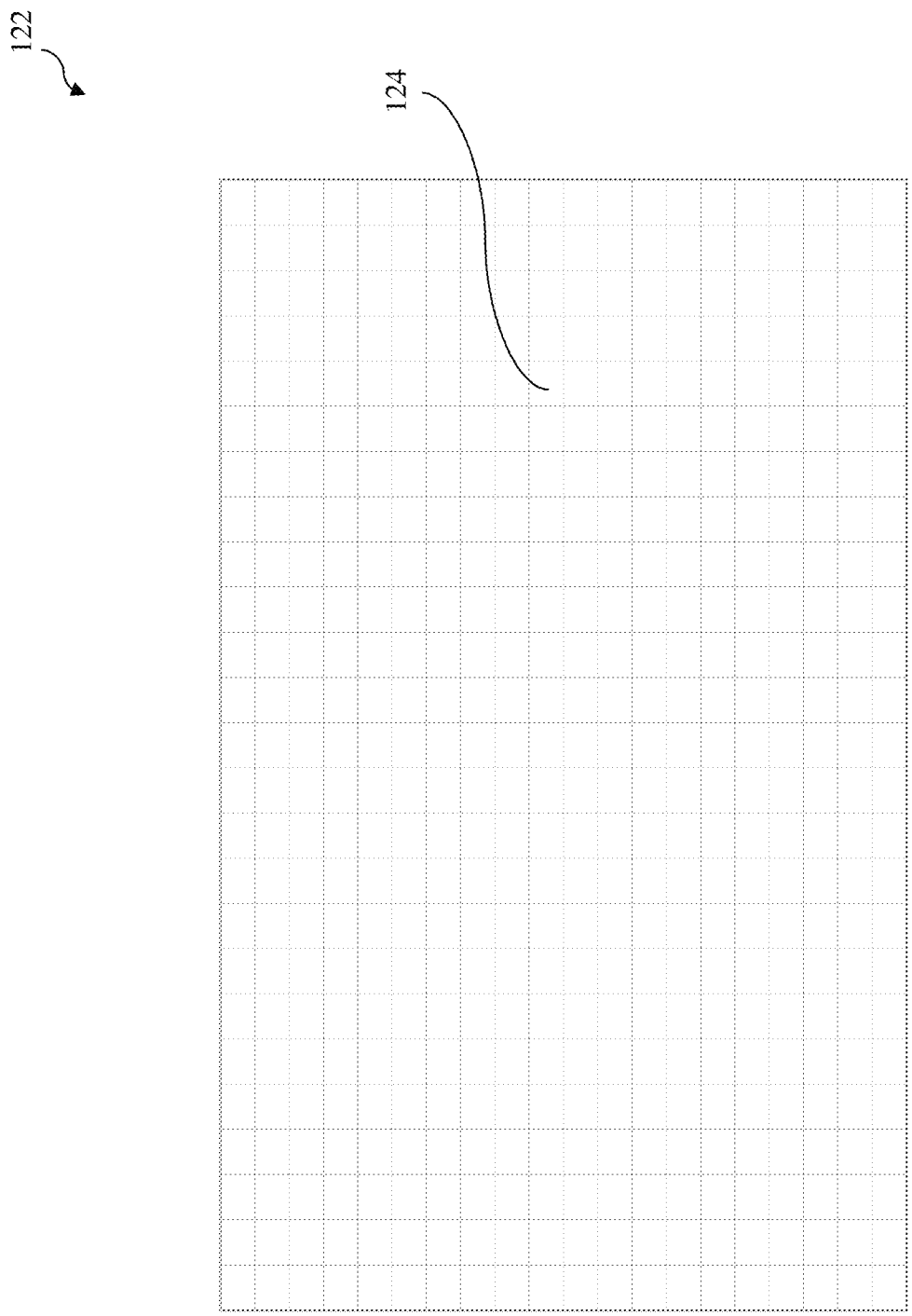
FIG. 3 is a schematic view of the semiconductor substrate of FIG. 2, in portion, constructed according to aspects of the present disclosure in one embodiment.

Referring to FIGS. 1 and 3, the method 100 includes an operation 103 by defining, on the semiconductor substrate 120, a plurality of regions 124 (also referred to as templates 124) for subsequent operations. In the present embodiment, each chip 122 of the semiconductor substrate 120 is divided into multiple templates 124, as illustrated in FIG. 3. The templates 124 have an equal area. The number of templates 124 in the full chip is "N". Various templates 124 are referred to as 1, 2, 3, ..., i, ... and N, respectively. In the present example, each template 124 includes a rectangle or a square region in the semiconductor substrate 120.

The number N may be determined according to one or more factors. In some embodiments, the number N is majorly determined by template size, which is closed related to e-beam model ambit (electron diffusion or convolution kernel range in μm). In some embodiment, the factors may include calculation efficiency. When the number N is larger, the operations in the following process may take longer time but higher optimization effectiveness. In some embodiments, the number N may be chosen according to others factors, such as engineer experience and/or previous processed data (such as historic data collected from execution of the method 100).

The IC design layout to be formed on the chip is defined in various templates 124. The IC design layout in each template 124 includes a main pattern. The main pattern in different templates may be different from each other, depending on individual IC design layout.

Still referring to FIG. 1, the method 100 includes an operation 104 by generating space block layers with different space isolation distances. The operation 104 is described below according to one embodiment. The method of generating space block layers is described in U.S. patent application Ser. No. 14/253,282, filed Apr. 15, 2014, now U.S. publication number 2015-0294057, according to various embodiments, the entire disclosure being hereby incorporated by reference.

Figure 4:
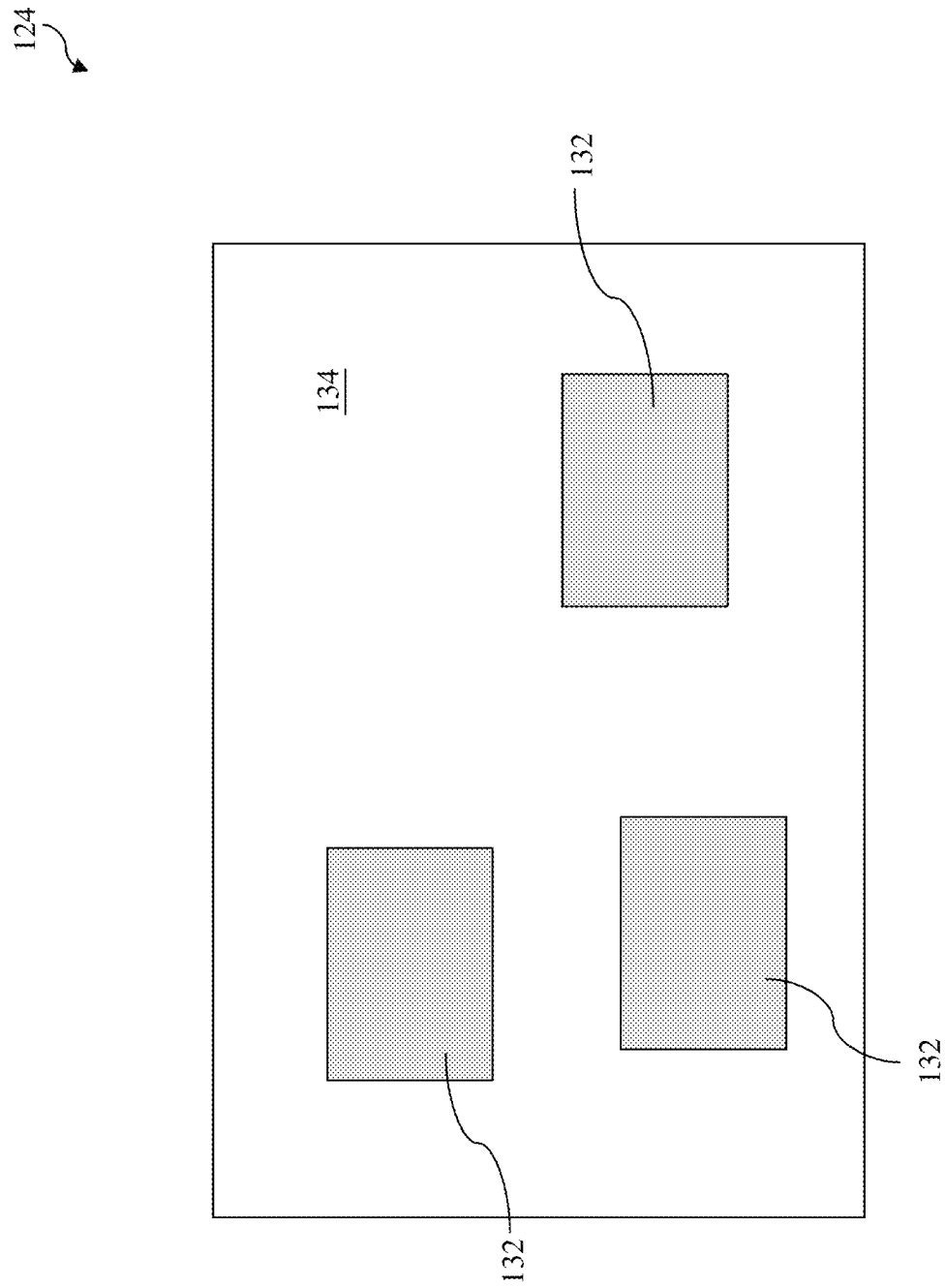
FIGS. 4, 5 and 7 illustrate an integrated circuit (IC) pattern constructed according to aspects of the present disclosure in one embodiment.

FIG. 4 illustrates a template 124 and an exemplary main pattern to be formed thereon. The main pattern includes a plurality of main features 132. A main feature is a geometrical pattern that defines an IC feature (such as contact/via hole, to be formed on the semiconductor substrate 120), or a portion of the IC feature. In the following description of the method 100, the main pattern is described with the semiconductor substrate 120, even though the main pattern is not yet transferred to the semiconductor substrate 120 during those operations of the method 100.

The template 124 also includes background regions 134 that are areas without main feature to be defined on the semiconductor substrate 120. Illustrated in FIG. 4 is only a portion of the IC design layout one template 124. Other portions of the IC design layout may have different patterns, such as including various main features 132 and background regions 134.

Figure 5:
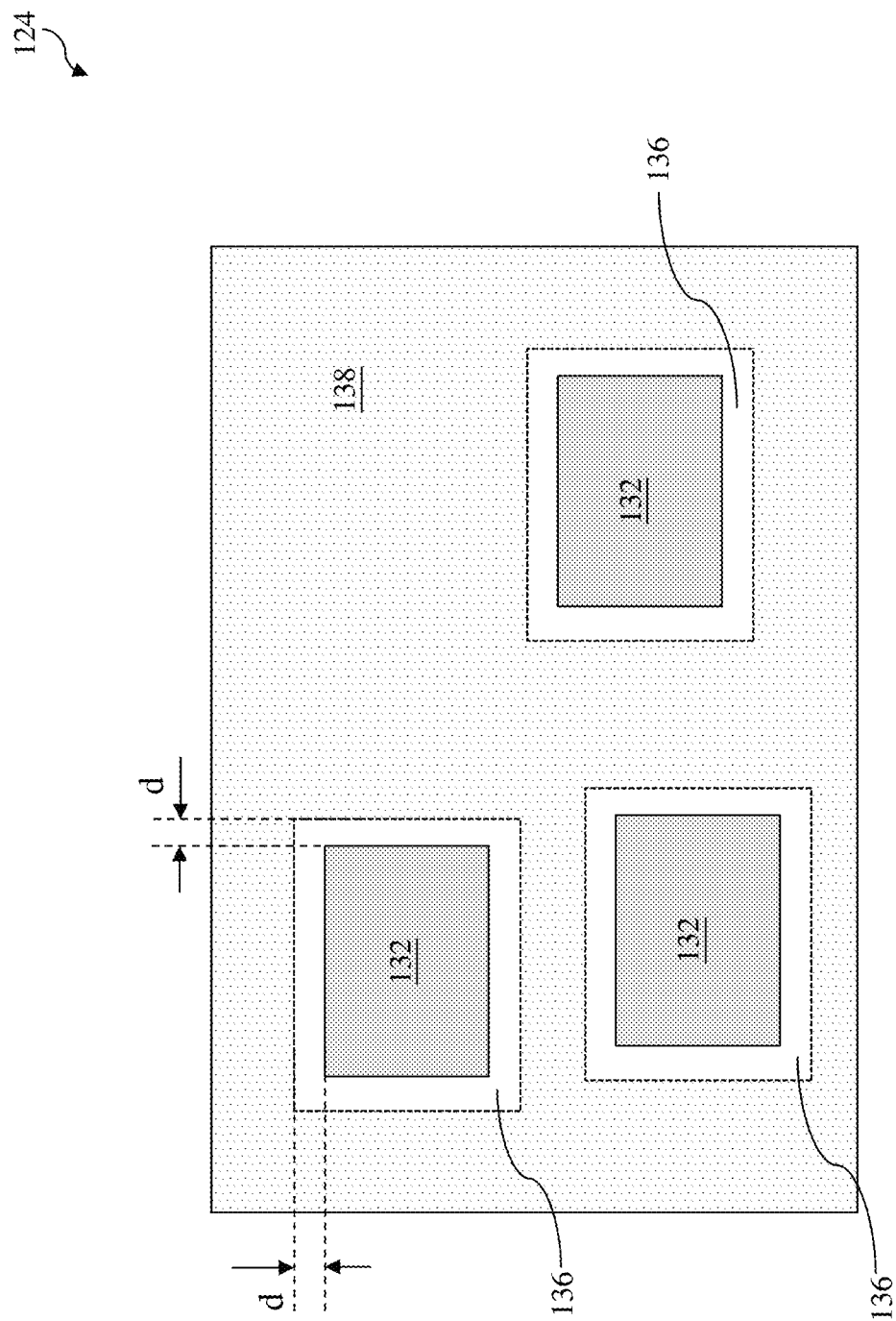

Referring to FIG. 5, a space isolation distance (or simply referred to as isolation distance) "d" is a parameter to define one forbidden area 136 that is surrounding a main feature 132 and excludes dummy features from being inserted therein. The template 124 includes a plurality of main features 132 and accordingly a plurality of forbidden areas 136 surrounding the respective main features 132. By excluding the main features 132 and the forbidden areas 136, rest regions in template 124 are defined as space block(s) 138 for dummy insertion. The template 124 includes the main features 132, the forbidden areas 136, and space block(s) 138.

When the isolation distance d is changed, the space block 138 is changed accordingly. The isolation distance d is constrained to be equal to or greater than a minimum isolation distance $d_{min}$, formulated as $d \geq d_{min}$. The minimum isolation distance $d_{min}$ is determined according to one or more factors, such as IC fabrication limitation or process window. The isolation distance d is chosen in a range greater than $d_{min}$ ($d \geq d_{min}$). When one isolation distance d is chosen, a set of space blocks 138 is generated accordingly. The set of space blocks 138 is referred to as a space block layer associated with the respective isolation distance. When a plurality of isolation distances are chosen, a plurality of space block layers are generated, respectively. Each of the space block layers defines a set of space blocks 138 different from those defined in other space block layers. In various examples, the operations 103 and 104 may be implemented in different sequences.

In the above description of the operation 104, even though one template is used for convenience, the operation 104 is applied to the plurality of templates defined on the semiconductor substrate 120.

The method 100 proceeds to operation 106 by calculating pattern density of every template in various space block layers. Therefore, each pattern density may be a function of the template and the space block layer.

The pattern density parameters to be calculated includes $PD_O$ and $PD_S$. $PD_O$ is pattern density of the main features in the template and is referred to as main pattern density $PD_O$. In the present embodiment, the main pattern density of the template is defined as the total area $S_m$ of all main features in the template 124 over the template area $S_t$, formulated as $S_m/S_t$. For example, when the main features completely fill in the template 124, the main pattern density $D_O$ for that template is 100% or 1. In another example, when the main features fill half areas of the template, then the main pattern density $PD_0$ for that template is 50% or 0.5. Since the templates are labeled to 1, 2, ..., i, ..., and N, the corresponding main pattern densities for various templates are referred to as $PD_0(1)$, $PD_0(2)$, $PD_0(3)$, ... $PD_0(i)$, ..., $PD_0(N)$, respectively. The main patent density $PD_0(i)$ for an exemplary template "i" is not the function of the isolation distance "d" and remains the same for various space block layers.

$PD_s$ is pattern density of the dummy features in the template and is also referred to as block dummy pattern density (or simply dummy pattern density) $PD_s$. The dummy pattern density $PD_s$ is defined as the total area $S_d$ of the all space blocks in the template 124 over the template area $S_t$, formulated as $S_d/S_t$. Similarly, for the templates 1, 2, ..., i, ..., and N, the corresponding dummy pattern densities are referred to as $PD_s(1)$, $PD_s(2)$, $PD_s(3)$, ... $PD_s(i)$, ..., $PD_s(N)$, respectively. The dummy pattern density $PD_s(i)$ for the exemplary template "i" is a function of the isolation distance d in the corresponding space block layer. When the isolation distance d is increased, the total area $S_d$ of all space blocks in the template is decreased. The dummy pattern density $PD_s$ is decreased accordingly. The calculation of the dummy pattern densities $PD_s(i)$ are executed to all templates and for various space block layers.

The method 100 proceeds to operation 107 by calculating a block dummy density ratio with lease pattern density variation (or least variation block dummy density ratio or LVBDDR) for every space block layer. In the present embodiment, the operation 107 is implemented by using a pattern density uniformity (PDU) statistical formula.

A total pattern density PD in one template refers to the pattern density of various features, including main features and dummy features (to be formed) in that template. The total pattern density PD is defined as $$PD = PD_0 + rPD_s(d). \quad \text{(equation 1)}$$

As noted above, $PD_0$ is main pattern density and $PD_s$ is dummy pattern density. The total pattern density PD is related to the main pattern density $PD_0$ and the dummy pattern density $PD_s$ by the equation 1. Since the dummy pattern density $PD_s$ is a function of the isolation distance "d" and varies over different space block layers, the total pattern density PD is also a function of the isolation distance "d" and varies over different space block layers.

In the equation 1, the parameter "r" is a block dummy density ratio to all templates (1, 2, 3, ..., and N) of the semiconductor substrate 120. The dummy pattern density contributes to the total pattern density by $rPD_s$ instead of $PD_s$ since the space blocks 138 are generally not completely filled with dummy features. As block dummy density ratio, the parameter "r" is related to the filling ratio or transparent ratio. As one example for better understanding the concept of the block dummy density ratio "r", assume that the dummy features occupies an area $S_f$ in the area $S_d$ of the space blocks 138 in a given template, the final contribution of the dummy features to the total pattern density in the given template is related to a ratio as $S_f/S_d$. In other words, the contribution of the dummy features to the total pattern density is the product of the ratio $S_f/S_d$ and the $PD_s$. The ratio $S_f/S_d$ is related to the block dummy density ratio "r". However, the dummy features are not defined yet at this stage. Furthermore, each of the space blocks 138 is treated as one dummy feature during this operation 107 and the following operation 108 until real dummy features are determined at the operation 109. By this, various simulations for dummy insertion are more efficient and save iteration time since one space block is simulated and evaluated instead of a plurality of dummy features to be inserted in the space block. In addition, the block dummy density ratio "r" is a universal parameter to various templates. In the equation 1, the block dummy density ratio "r" is a weighting factor or a gray level of the space blocks in the template when each of those space blocks is treated as a dummy feature. The block dummy density ratio "r" has a value ranging between 0 and 1, as $0 \le r \le 1$.

The least variation block dummy density ratio is noted as $r_0$. For a given space block layer, the least variation block dummy density ratio $r_0$ is the block dummy density ratio that the corresponding total pattern density has the lease pattern density variation. The least variation block dummy density ratio $r_0$ is determined, for a given space block layer, by the PDU statistical formula as, $$r_0 = (\overline{PD_0 \cdot PD_s} - \overline{PD_0} \cdot \overline{PD_s})/\sigma_s^2 \quad \text{(equation 2)}$$

Various parameters in the equation 2 are further defined below. $\overline{PD_0}$ is the average main pattern density defined as an average of the main pattern densities over various templates. Specifically, the average main pattern density $\overline{PD_0}$ is defined in and calculated by the following formula, $$\overline{PD_0} = [PD_0(1) + PD_0(2) + PD_0(3) + \ldots + PD_0(i) + \ldots + PD_0(N)]/N \quad \text{(equation 3)}$$

In which $PD_0(i)$ represents the main pattern density of the template "i". The average main pattern density $\overline{PD_0}$ remains the same for various space block layers.

Similarly, $\overline{PD_s}$ is the average dummy pattern density defined in and calculated by the following formula, $$\overline{PD_s} = [PD_s(1) + PD_s(2) + PD_s(3) + \ldots + PD_s(i) + \ldots + PD_s(N)]/N \quad \text{(equation 4)}$$

The average dummy pattern density $\overline{PD_s}$ is for the given space block layer and varies over different space block layers.

The term $\overline{PD_0 \cdot PD_s}$ is the average of the product $PD_0 \cdot PD_s$ over all templates (templates 1, 2, 3, ..., and N). The parameter $\sigma_s$ is the standard deviation of the space block layer pattern density and is defined as $$\sigma_s^2 = \overline{PDs^2} - (\overline{PDs})^2 \quad \text{(equation 5)}$$

where $\overline{PDs^2}$ is the average of $PD_s^2$ over all templates and $\overline{PDs}$ is the average of the space block layer pattern density $PD_s$ over all templates.

In furtherance of the present embodiment, the PDU statistical formula defined in equation 2 is generated by the procedure as below. The parameter $\sigma^2$ is defined as $\sigma^2 = \overline{PD^2} - \overline{PD}^2$. The average total pattern density $\overline{PD}$ is defined as $$\overline{PD} = \overline{PD_0} + r \cdot \overline{PD_s} \quad \text{(equation 6)}$$

while $\overline{PD^2}$ is defined as $$\overline{PD^2} = (\overline{PD_0 + rPD_s})^2 \quad \text{(equation 7)}$$

With further mathematical operations that include substituting equations 6 and 7, it is found that the parameter $\sigma^2$ is the function of r in the form $$\sigma^2 = ar^2 + br + c \quad \text{(equation 8)}$$

where the coefficients a and b are functions of space isolation distance d, and the coefficient c is a constant. Particularly, the parameter $\sigma$ is a function of r noted as $\sigma(r)$. For the given space block layer and the corresponding isolation distance d, the parameter $\sigma$ has a minimum at certain r, which means the pattern density variation over templates is minimized. The minimum of the parameter $\sigma$ is determined by restraining σ'(r)=0, leading to r=−b/(2a) that further gives the equation 2. Thus determined block dummy density ratio "$r_0$" is referred to as least variation block dummy density ratio or LVBDDR.

The method 100 proceeds to operation 108 by choosing the space block layer (with the corresponding isolation distance d) and the block dummy density ratio "r" according to pattern density uniformity and other factors, such as process window and throughput. Thus chosen space block layer (with the corresponding isolation distance d) and the block dummy density ratio "r" are referred to as the optimized space block layer and the optimized block dummy density ratio, respectively.

Figure 6:
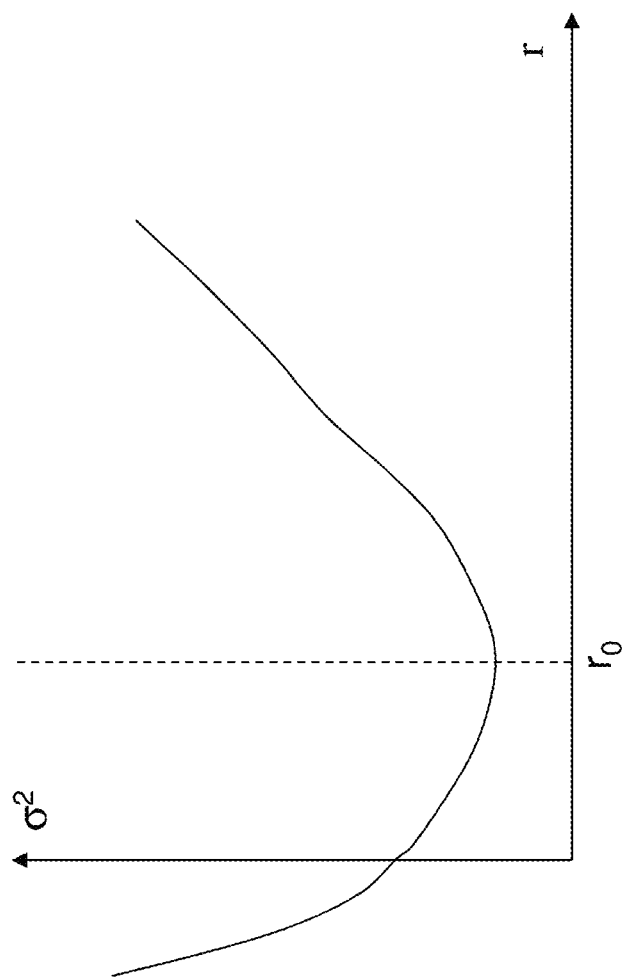
FIG. 6 is a diagram illustrating the relationship of σ vs. block dummy density ratio r constructed according to aspects of the present disclosure in one embodiment.

The pattern density uniformity is one factor to be considered. FIG. 6 illustrates the standard deviation σ as a function of the block dummy density ratio r. The least variation block dummy density ratio "$r_0$" corresponds to the minimum of the standard deviation σ, which means the pattern density has the least variation at $r_0$. The least variation block dummy density ratio "$r_0$" maximizes the pattern density uniformity for the corresponding space block layer. However, when the block dummy density ratio "r" is close enough to $r_0$ in a certain range, it still provides acceptable pattern density uniformity and leaves a room for tuning other parameters, such as process window and throughput.

The throughput as another factor includes simulation time, the duration of the etch process to form the dummy features on the semiconductor substrate 120, and/or e-beam writing time during the e-beam lithography process to transfer the main features 132 and the dummy features to the semiconductor substrate 120.

The process window is a collection of values of process parameters that allow circuit to be manufactured under desired specifications. In one embodiment, the process window is one factor to be considered in determining a proper isolation distance "d" and the block dummy density ratio "r". In one example, the process window for the critical dimension (CD) is considered to ensure the CD is in the desired range. When the pattern density changes, the corresponding exposure intensity relative to the exposure threshold varies, causing CD variation. When the pattern density is higher or lower, the CD may be out of specification.

In another example where the dummy features are sub-resolution features for optical proximity correction (OPC) and are not printable in the semiconductor substrate 120, the process window is considered. When the dummy pattern density is too higher, the dummy features are printable. To avoid the situation where the dummy features are unexpectedly printable, a constrain of maximum dummy pattern density may be set up such that the corresponding exposure dosage in the dummy blocks are less than the exposure threshold of the lithography exposure with a certain margin (e.g., 25% or higher).

With consideration all above factors, a space block layer (with the corresponding isolation distance "d") and the optimized block dummy density ratio "r" (close to "$r_0$" in the certain range) are chosen in the operation 108.

Figure 7:
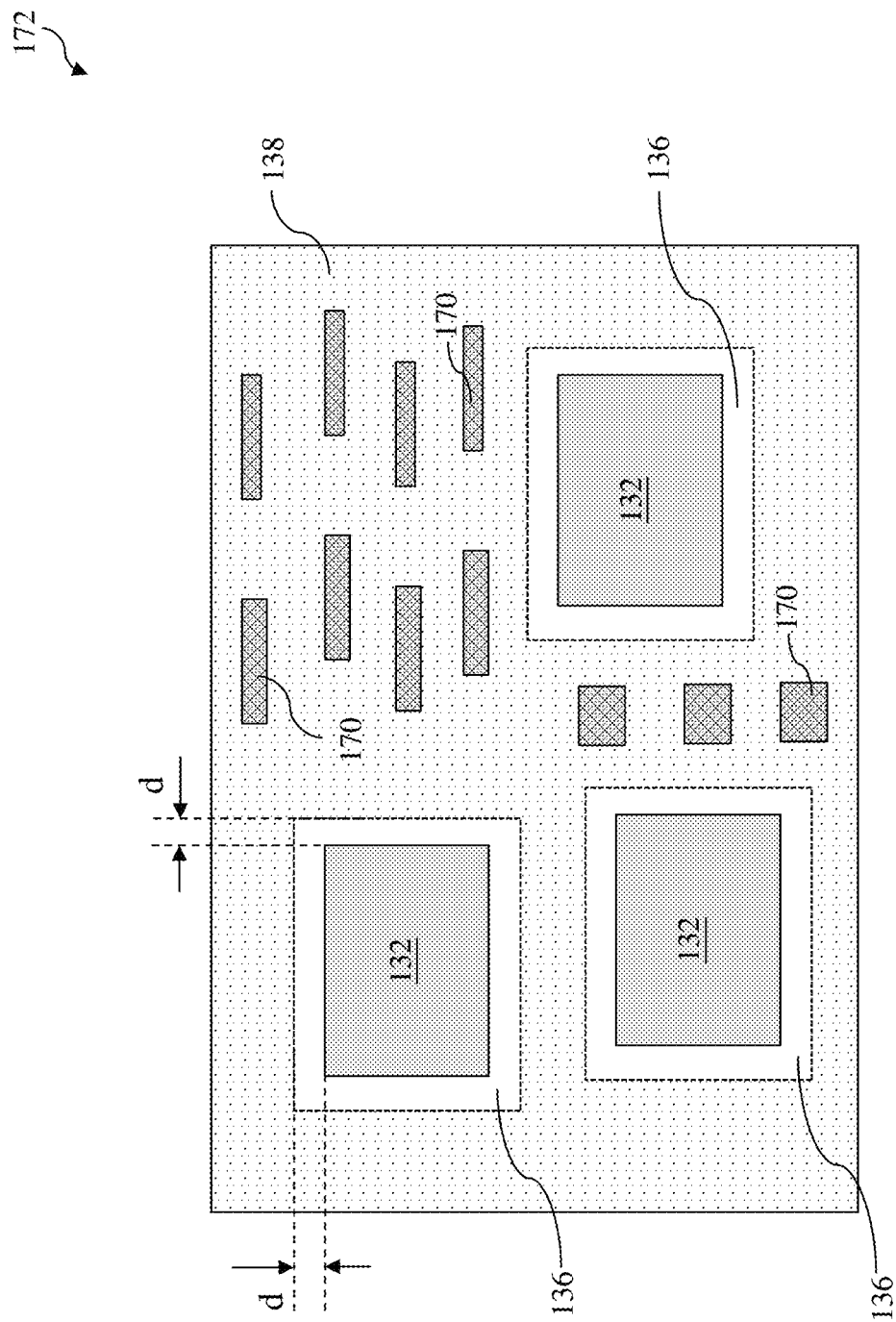

The method 100 proceeds to operation 109 by generating dummy features 170 in space blocks 138 according to the optimized space block layer (d) and the optimized block dummy density ratio (r). Accordingly, a modified IC design layout is generated and includes the main features 132 and the dummy features 170 as illustrated in FIG. 7.

In one embodiment, the dummy features 170 are generated in the space blocks 138 with a local dummy pattern density equal to the optimized block dummy density ratio "r". The local dummy pattern density is defined as the total area $S_f$ of the dummy features to the total area $S_d$ of the space blocks 138 in one template 124, formulated as $S_f/S_d$. The dummy features 170 may be generated by a rule-based procedure. In furtherance of the present embodiment, the modified IC pattern 172, which includes the main features 132 and the generated dummy features 170, is used to form a mask for a photolithography exposure process that transfers the IC pattern into a photoresist layer coated on the semiconductor substrate 120.

The dummy features 170 may be designed into various suitable shapes, sizes and pitches. For examples, dummy features 170 are shaped into squares, or rectangles (bars). In other examples, the dummy features 170 are designed as positive dummy features (as island features when formed on the semiconductor substrate 120) or negative dummy features (as trench features when formed on the semiconductor substrate 120). Alternatively, the dummy features 170 are configured in an irregular dummy array.

In another embodiment where electron-beam (e-beam) lithography is used for transferring an IC pattern to an e-beam sensitive resist layer coated on the semiconductor substrate 120, the dummy features are simply those space blocks 138, as illustrated in FIG. 5. Specifically, the modified IC pattern includes the main features 132 and the space blocks 138.

The method 100 may proceed to operation 110 by generating a tape-out of the modified IC pattern 172 for mask making or e-beam writing. The tape-out represents an IC pattern in a format that can be used for mask making or e-beam writing. At this operation, the modified IC pattern 172 may be fractured into a plurality of polygons (or trapezoids). The tape-out is formed based on the modified IC pattern 172 generated in the operation 109.

In one embodiment, the modified IC pattern 172 includes the main features 132 and the dummy features 170. The modified IC pattern is used to form a mask to be used in a photolithography process to transfer the main features to the semiconductor substrate 120. In one example, the dummy features 170 may be sub-resolution features for optical proximity correction (OPC) to enhance the imaging resolution. Those sub-resolution features are nonprintable to the semiconductor substrate 120 by the corresponding photolithography process. In another example, the dummy features 170 are printable features designed to tune the pattern density for improved effect of a manufacturing process, such as CMP or thermal annealing.

In another embodiment, an e-beam in an e-beam lithography exposure process is used to directly write the modified IC pattern 172 to (the e-beam sensitive resist layer coated on) the semiconductor substrate 120. The modified IC pattern 172 includes the main features 132 with the first exposure dosage I and the space blocks 138 (as the dummy features) with the second exposure dosage r·I less than the first exposure dosage. The resist layer is exposed by one e-beam lithography exposure process to expose different regions with respective doses. In this case, the dummy features are expanded to the space blocks. The e-beam writing dosage to the dummy features during the e-beam lithography process spreads to the space blocks. Accordingly, the space charge effect is reduced.

Other operations may follow. In one embodiment, the method 100 may further proceed to an operation for the fabrication of a mask or a set of masks based on the tape-out of the modified IC pattern 172. In one embodiment, an e-beam or a mechanism of multiple e-beams is used to form a pattern on a mask (photomask or reticle) based on the modified IC pattern. The mask can be formed in various suitable technologies. In one embodiment, the mask is formed using the binary technology. In this case, the mask pattern includes opaque regions and transparent regions. In one example, the binary mask includes a transparent substrate (e.g., fused quartz), and an opaque material (e.g., chromium) coated in the opaque regions of the mask. In another embodiment, the mask is formed using a phase shift technology. In the phase shift mask (PSM), various features in the pattern formed on the mask are configured to have proper phase difference to enhance the resolution and imaging quality. In various examples, the PSM may be an attenuated PSM or an alternating PSM known in the art. In other examples, the mask may be transmissive mask or reflective mask, such as extreme ultraviolet mask (EUV) mask. In furtherance of this embodiment, the semiconductor substrate 120 is fabricated using a mask or a set of masks formed by the above method.

In some embodiments, the tape-out of the modified IC pattern 172 is directly used to pattern the semiconductor substrate 120 by an e-beam direct write (EBDW) lithography apparatus.

The present disclosure provides an integrated circuit (IC) method that effectively generates a modified IC design layout with minimized pattern density variation and calculation efficiency. The IC method includes determining a least variation block dummy density ratio and further determining an optimized space block layer according the least variation block dummy density ratio.

Various advantages of the present disclosure are present in various embodiments as mentioned in the above description. For example, by using the space block, the time and the cost to calculate and simulate the dummy features are reduced since instead of the dummy features defined in a space block being calculated and simulated but the space block is directly being calculated and simulated. In another example for e-beam lithography process to pattern the semiconductor substrate, the dummy features are expanded to the space blocks. The e-beam writing dosage to the dummy features during the e-beam lithography process spreads to the space blocks and is reduced. Accordingly, the space charge effect is reduced. In another example, various fabrication processes, such as lithography exposure process and etching, are sensitive to local pattern density variations, causing various deviations, such as CD variations. This is referred to as micro-loading effect. By using the disclosed method, the pattern density variation is reduced and the micro-loading effect is reduced as well.

Thus, the present disclosure provides one embodiment of an integrated circuit (IC) method. The IC method includes receiving an IC design layout having main features; generating a plurality of space block layers to the IC design layout, each of the space block layers being associated with an isolation distance and a plurality of space blocks; calculating main pattern density $PD_0$ and dummy pattern density $PD_s$ of the IC design layout; calculating a least variation block dummy density ratio (LVBDDR) of the IC design layout for each of the space layers according to the main pattern density and the dummy pattern density using a formula $PD=PD_0+rPD_s$, wherein PD is total pattern density and r is block dummy density ratio; choosing an optimized space block layer and an optimized block dummy density ratio according to the LVBDDR; generating a modified IC design layout from the IC design layout according to the optimized space block layer and the optimized block dummy density ratio; and forming a tape-out data of the modified IC design layout for IC fabrication.

The present disclosure also provides another embodiment of an IC method. The IC method includes receiving an IC design layout designed to have a plurality of main features to be formed on a semiconductor substrate; generating a plurality of space block layers to the IC design layout according to various isolation distances, respectively; dividing the semiconductor substrate into a plurality of templates; calculating main pattern density $PD_0$ of the IC design layout to the plurality of templates; calculating dummy pattern density $PD_s$ to the plurality of templates for each of the space block layers; calculating a least variation block dummy density ratio (LVBDDR) of the IC design layout for the each of the space block layers according to the main pattern density and the dummy pattern density; choosing an optimized space block layer and an optimized block dummy density ratio according to the LVBDDR; generating a modified IC design layout from the IC design layout according to the optimized space block layer and the optimized block dummy density ratio; and forming a tape-out data of the modified IC design layout for IC fabrication.

The present disclosure provides yet another embodiment of an IC method. The IC method includes receiving an IC design layout having a plurality of main features to be formed on a semiconductor substrate; generating a plurality of space block layers to the IC design layout according to various isolation distances, each of the space layers defining space blocks for non-circuit regions; defining a plurality of templates on the semiconductor substrate; calculating main pattern density $PD_0$ of the IC design layout to the plurality of templates; calculating dummy pattern density $PD_s$ to the plurality of templates for the each of the space block layers; calculating a least variation block dummy density ratio (LVBDDR) of the IC design layout for the each of the space block layers according to the main pattern density and the dummy pattern density; choosing an optimized space block layer and an optimized block dummy density ratio according to the LVBDDR and process window; generating a modified IC design layout from the IC design layout according to the optimized space block layer and the optimized block dummy density ratio, wherein the modified IC design layout includes dummy features defined in the space blocks; and forming a tape-out data of the modified IC design layout for IC fabrication.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) method comprising:
  receiving an IC design layout having main features;
  generating a plurality of space block layers to the IC design layout, each of the space block layers being associated with an isolation distance and a plurality of space blocks, wherein the isolation distance is greater than or equal to a minimum isolation distance determined by a process window;
  calculating main pattern density $PD_0$ and dummy pattern density $PD_s$ of the IC design layout;

calculating a least variation block dummy density ratio (LVBDDR) of the IC design layout for each of the space block layers according to the main pattern density and the dummy pattern density;

choosing an optimized space block layer and an optimized block dummy density ratio according to the LVBDDR;

generating a modified IC design layout from the IC design layout according to the optimized space block layer and the optimized block dummy density ratio; and forming a tape-out data of the modified IC design layout for IC fabrication.

2. The IC method of claim 1, wherein calculating the LVBDDR includes determining the LVBDDR $r_0$ by a formula $r_0 = (\overline{PD_0 \cdot PD_s} - \overline{PD_0} \cdot \overline{PD_s})/\sigma_s^2$, where $\overline{PD_0}$ is an average of the main pattern density;

$\overline{PD_s}$ is an average of the dummy pattern density;

$\overline{PD_0 \cdot PD_s}$ is an average of a product of the main pattern density and the dummy pattern density; and $\sigma_s$ is a standard deviation defined by a formula $\sigma_s^2 = \overline{PDs^2} - (\overline{PDs})^2$.

3. The IC method of claim 1, wherein choosing the optimized space block layer and the optimized block dummy density ratio includes choosing the optimized space block layer and the optimized block dummy density ratio according to the LVBDDR and further according to a pattern density uniformity and the process window.

4. The IC method of claim 1, further comprising dividing a semiconductor substrate into a plurality of IC regions, wherein calculating the main pattern density $PD_0$ and the dummy pattern density $PD_S$ includes calculating the main pattern density $PD_0$ and the dummy pattern density $PD_s$ for each of the plurality of IC regions.

5. The IC method of claim 1, wherein generating the plurality of space block layers includes generating space blocks in the IC design layout for each of the plurality of space block layers according to a corresponding isolation distance.

6. The IC method of claim 5, wherein generating the modified IC design layout includes generating dummy features in the space blocks.

7. The IC method of claim 6, wherein forming the tape-out data of the modified IC design layout includes forming the tape-out data of the modified IC design layout having main features and the dummy features for mask making.

8. The IC method of claim 5, wherein forming the tape-out data of the modified IC design layout includes forming the tape-out data of the modified IC design layout, wherein the tape-out data is used to directly write the main features to an e-beam sensitive resist layer coated on a semiconductor substrate.

9. The IC method of claim 1, further comprising writing the main features and the space blocks to an e-beam sensitive resist layer by an electron-beam exposure process.

10. An integrated circuit (IC) method comprising:
receiving an IC design layout designed to have a plurality of main features to be formed on a semiconductor substrate;
generating a plurality of space block layers to the IC design layout according to various isolation distances, respectively, wherein the various isolation distances are greater than or equal to a minimum isolation distance determined by a process window;
dividing the semiconductor substrate into a plurality of templates;
calculating main pattern density $PD_0$ of the IC design layout to the plurality of templates;
calculating dummy pattern density $PD_s$ to the plurality of templates for each of the space block layers;
calculating a least variation block dummy density ratio (LVBDDR) of the IC design layout for the each of the space block layers according to the main pattern density and the dummy pattern density;
choosing an optimized space block layer and an optimized block dummy density ratio according to the LVBDDR;
generating a modified IC design layout from the IC design layout according to the optimized space block layer and the optimized block dummy density ratio; and
forming a tape-out data of the modified IC design layout for IC fabrication.

11. The IC method of claim 10, wherein calculating the LVBDDR includes determining the LVBDDR $r_0$ by a formula $r_0 = (\overline{PD_0 \cdot PD_s} - \overline{PD_0} \cdot \overline{PD_s})/\sigma_s^2$, where $\overline{PD_0}$ is an average of the main pattern density over the IC templates;

$\overline{PD_s}$ is an average of the dummy pattern density;

$\overline{PD_0 \cdot PD_s}$ is an average of a product of the main pattern density and the dummy pattern density; and $\sigma_s$ is defined by a formula $\sigma_s^2 = \overline{PDs^2} - (\overline{PDs})^2$.

12. The IC method of claim 10, wherein choosing the optimized space block layer and the optimized block dummy density ratio includes choosing the optimized space block layer and the optimized block dummy density ratio according to the LVBDDR and further according to a pattern density uniformity and the process window.

13. The IC method of claim 10, wherein generating the space block layers includes generating space blocks in the IC design layout for each of the space block layers according to a corresponding one of the isolation distances.

14. The IC method of claim 13, wherein
generating the modified IC design layout includes generating dummy features in the space blocks; and
the dummy features have a local dummy pattern density determined by the optimized block dummy density ratio.

15. The IC method of claim 14, wherein forming the tape-out data of the modified IC design layout includes forming the tape-out data of the modified IC design layout having the main features and the dummy features for mask making.

16. The IC method of claim 13, wherein forming the tape-out data of the modified IC design layout includes forming the tape-out data of the modified IC design layout having main features and space blocks, wherein the tape-out data is used to directly write the main features and the space blocks to an e-beam sensitive resist layer coated on a semiconductor substrate by an electron-beam lithography exposure process.

17. An integrated circuit (IC) method comprising:
receiving an IC design layout having a plurality of main features to be formed on a semiconductor substrate;
generating a plurality of space block layers to the IC design layout according to various isolation distances, each of the space layers defining space blocks for non-circuit regions;
defining a plurality of templates on the semiconductor substrate;
calculating main pattern density $PD_0$ of the IC design layout to the plurality of templates;
calculating dummy pattern density $PD_s$ to the plurality of templates for the each of the space block layers;

calculating a least variation block dummy density ratio (LVBDDR) of the IC design layout for the each of the space block layers according to the main pattern density and the dummy pattern density;

choosing an optimized space block layer and an optimized block dummy density ratio according to the LVBDDR and process window;

generating a modified IC design layout from the IC design layout according to the optimized space block layer and the optimized block dummy density ratio, wherein the modified IC design layout includes dummy features defined in the space blocks;

forming a tape-out data of the modified IC design layout for IC fabrication; and directly writing the main features and the space blocks to an e-beam sensitive resist layer coated on a semiconductor substrate by an electron-beam lithography exposure process.

18. The IC method of claim 17, wherein calculating the LVBDDR includes determining the LVBDDR $r_0$ by a formula $r_0 = (\overline{PD_0 \cdot PD_s} - \overline{PD_0} \cdot \overline{PD_s})/\sigma_s^2$, where $\overline{PD_0}$ is an average of the main pattern density over the IC templates;

$\overline{PD_s}$ is an average of the dummy pattern density;

$\overline{PD_0 \cdot PD_s}$ is an average of a product of the main pattern density and the dummy pattern density; and $\sigma_s$ is defined by a formula $\sigma_s^2 = \overline{PDs^2} - (\overline{PDs})^2$.

19. The IC method of claim 17, further comprising dividing a semiconductor substrate into a plurality of IC regions, wherein calculating the main pattern density $PD_0$ and calculating the dummy pattern density $PD_s$ includes calculating the main pattern density $PD_0$ and the dummy pattern density $PD_s$ for each of the IC regions.

20. The IC method of claim 17, wherein the various isolation distances are greater than or equal to a minimum isolation distance determined by a process window.

* * * * *